United States Patent

Sangregory

[11] Patent Number: 5,812,884
[45] Date of Patent: Sep. 22, 1998

[54] CLOSING LIGHT LOCK OF FILM CARTRIDGE BREAKS ANTI-BACKUP PAWL FOR FILM WINDER WHEEL IN ONE-TIME-USE CAMERA, TO PREVENT UNAUTHORIZED REUSE

[75] Inventor: Jude A. Sangregory, Spencerport, N.Y.

[73] Assignee: Eastman Kodak Company, Rochester, N.Y.

[21] Appl. No.: 872,125

[22] Filed: May 27, 1997

[51] Int. Cl.⁶ .................................................. G03B 17/26
[52] U.S. Cl. ............................... 396/6; 396/396; 396/411
[58] Field of Search ................................ 396/6, 395, 396, 396/411

[56] References Cited

U.S. PATENT DOCUMENTS

| | | |
|---|---|---|
| 3,136,291 | 6/1964 | Irisawa et al. . |
| 5,235,366 | 8/1993 | Kucmerowski . |
| 5,349,410 | 9/1994 | Kamata . |
| 5,452,033 | 9/1995 | Balling et al. . |
| 5,517,270 | 5/1996 | Balling . |
| 5,534,962 | 7/1996 | Zander . |
| 5,579,070 | 11/1996 | Smart et al. . |
| 5,600,395 | 2/1997 | Balling et al. . |

FOREIGN PATENT DOCUMENTS

| | | |
|---|---|---|
| 8-201987 | 8/1996 | Japan . |
| 8-201990 | 8/1996 | Japan . |

*Primary Examiner*—David M. Gray
*Attorney, Agent, or Firm*—Roger A. Fields

[57] ABSTRACT

A one-time-use camera for use with a film cartridge having a spool rotatable to wind an exposed filmstrip including a trailing film end portion into the cartridge and a light lock movable to be closed after the trailing film end portion is wound into the cartridge, comprising a film winder rotatable in engagement with the spool in a film winding direction to rotate the spool in the same direction to wind the exposed filmstrip including the trailing film end portion into the cartridge, and a closing actuator movable in engagement with the light lock to close the light lock, is characterized in that an anti-backup pawl for engaging the film winder to prevent rotation of the film winder in a reverse direction opposite to the film winding direction is breakable, and the closing actuator has a breaking element for breaking the anti-backup pawl when the closing actuator is moved in engagement with the light lock to close the light lock.

4 Claims, 4 Drawing Sheets

5,812,884

CLOSING LIGHT LOCK OF FILM CARTRIDGE BREAKS ANTI-BACKUP PAWL FOR FILM WINDER WHEEL IN ONE-TIME-USE CAMERA, TO PREVENT UNAUTHORIZED REUSE

FIELD OF THE INVENTION

The invention relates generally to the field of photography, and in particular to one-time-use cameras.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional 35 mm film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

To use the one-time-use camera, after the photographer takes a picture he manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip, to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from a fresh cartridge is attached to the film take-up spool, the fresh cartridge and the film take-up spool are loaded into the cartridge receiving and film supply chambers, and an intermediate leader section which bridges the film take-up spool and the fresh cartridge is engaged with the metering sprocket. The front and rear cover parts are connected to the main body part and/or to the front cover part to complete the camera unit. Then, an engageable end of the take-up spool which protrudes from the film roll chamber is rotated to factory prewind substantially the entire length of the unexposed filmstrip from the fresh cartridge onto the film take-up spool and to rotate the metering sprocket to increment the frame counter to its total-available frame number setting. Lastly, the outer box or label is placed on the camera unit.

The conventional cartridge typically used in the one-time-use camera has a light-trapping plush, within a film egress/ingress slot, to prevent ambient light from entering the film cartridge through the slot. As contrasted with the conventional cartridge, prior art U.S. Pat. No. 5,357,303 issued Oct. 18, 1994 discloses a new-type cartridge having a spool rotatable to wind an exposed filmstrip into the film cartridge, and a light lock pivotable closed after the exposed filmstrip is wound into the film cartridge. The new-type cartridge can be used in a one-time-use camera. For example, U.S. Pat. No. 5,600,395 issued Feb. 7, 1997 and U.S. Pat. No. 5,614,976 issued Mar. 25, 1997 each discloses a one-time-use camera for use with the new-type cartridge. This camera includes a thumbwheel manually rotatable in coaxial engagement with the spool inside the film cartridge, in a film winding direction, to similarly rotate the spool to wind the exposed filmstrip into the film cartridge, and a closing actuator coaxially engaged with the light lock to begin to close the light lock when an integral film sensor of the closing actuator senses that the exposed filmstrip is wound into the film cartridge. The thumbwheel is coupled with the closing actuator to continue to close the light lock when the thumbwheel is further rotated in the film winding direction.

Problem

There is a need recognized in the industry to prevent unauthorized recycling of one-time-use cameras in order to maintain camera quality. Unauthorized recycled cameras may be of lesser quality than authorized recycled cameras. This problem is further described in U.S. Pat. No. 5,452,033 issued Sep. 19, 1995 and U.S. Pat. No. 5,235,366 issued Aug. 10, 1993.

One example of a solution to the problem is disclosed in prior art U.S. Pat. No. 5,349,410 issued Sep. 20, 1994. This patent suggests as a way to prevent unauthorized recycling that an anti-backup pawl for the thumbwheel be broken when the rear cover part is separated from the main body part to obtain the film cartridge.

Another example of a solution to the problem is disclosed in Japan Patent Application No. 8-201987 published Aug. 9, 1996. The patent application suggests as a way to prevent unauthorized recycling that an anti-backup pawl for the thumbwheel be broken when the thumbwheel is manually rotated in a reverse direction opposite to the film winding direction. The thumbwheel must be reverse rotated to close the light lock of the new-type cartridge disclosed in U.S. Pat. No. 5,357,303. If, however, one forgets to reverse rotate the thumbwheel, the light lock remains open.

SUMMARY OF THE INVENTION

A one-time-use camera for use with a film cartridge having a spool rotatable to wind an exposed filmstrip including a trailing film end portion into the cartridge and a light lock movable to be closed after the trailing film end portion is wound into the cartridge, comprising a film winder rotatable in engagement with the spool in a film winding direction to rotate the spool in the same direction to wind the exposed filmstrip including the trailing film end portion into the cartridge, and a closing actuator movable in engagement with the light lock to close the light lock, is characterized in that:

an anti-backup pawl for engaging the film winder to prevent rotation of the film winder in a reverse direction opposite to the film winding direction is breakable; and the closing actuator has a breaking element for breaking the anti-backup pawl when the closing actuator is moved in engagement with the light lock to close the light lock.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Film Cartridge

Figure 1:
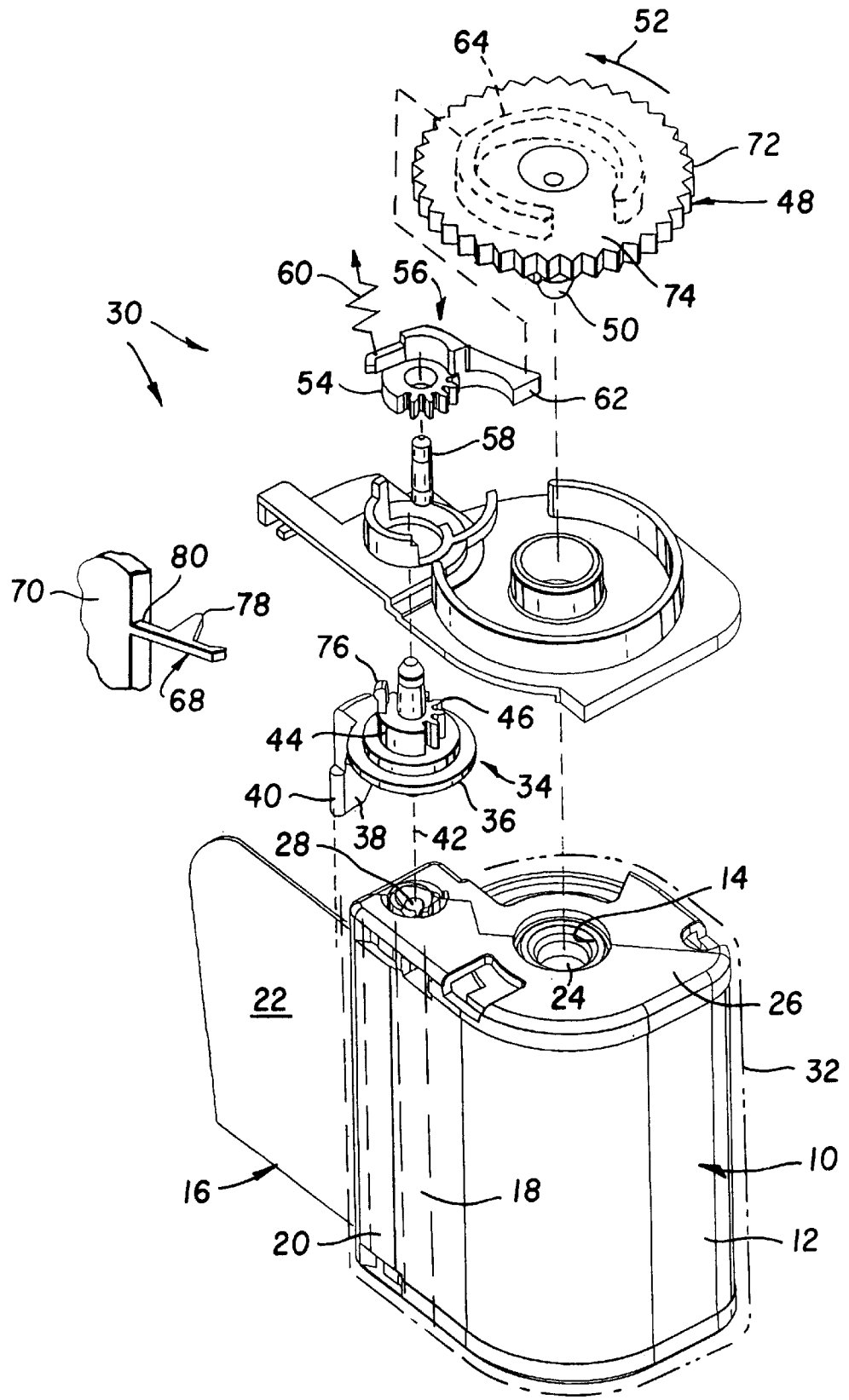
FIG. 1 is an exploded perspective view of a one-time-use camera according to a preferred embodiment of the invention.

Referring now to the drawings, FIG. 1 shows a film cartridge 10 similar in operation to ones disclosed in prior art U.S. Pat. No. 5,357,303, issued Oct. 18, 1994, and U.S. Pat. No. 5,231,438, issued Jul. 27, 1993. The film cartridge 10 includes a cartridge shell 12 that contains a flanged spool 14 on which is stored a wound unexposed/exposed filmstrip 16. A slightly elastic light lock 18 is supported within a film egress/ingress slot 20 in the cartridge shell 12 to be pivoted open to permit film movement out of and back into the shell, through the slot, and to be pivoted closed to prevent ambient light from entering the shell, through the slot.

FIG. 1 shows the film cartridge 10 with the light lock 18 open and all but a trailing film end portion 22 of the filmstrip 16 wound into the cartridge shell 12 after the filmstrip is exposed outside the cartridge shell.

The spool 14 has a coaxial drive cavity 24 accessible at a drive end 26 of the cartridge shell 12 and the light lock 18 has a coaxial drive cavity 28 accessible at the same end of the cassette shell as shown in FIG. 1.

Camera

A partially shown camera 30 with which the film cartridge 10 is to be used is shown in FIGS. 1–4.

As shown in FIG. 1, the camera 50 includes a cartridge chamber 32 for the film cartridge 10. The chamber 32 is open at its bottom, and has a film egress/ingress slot (not shown) opposite the film egress/ingress slot 20 in the cartridge shell 12 to permit film movement out of and back into the chamber. An actuator unit 34 for pivoting the light lock 18 closed after the trailing film end portion 22 is wound into the cartridge shell 12 comprises an integral single-piece driver 36 and film sensor lever 38. The film sensor lever 38 has a sensor head 40 shown in FIGS. 1 and 2 in contact with the trailing film end portion 22. The driver 36 has a depending drive-part 42 located in the drive cavity 28 of the light lock 18 to rotationally engage the light lock in order to pivot the light lock closed, and a coaxial upstanding gear-support-part 44 on which is coaxially fixed a first spur gear 46. Rotation of the first spur gear 46 in a counter-clockwise direction in FIGS. 1 and 2 similarly rotates the drive-part 42 to pivot the light lock 18 closed.

A film winder thumbwheel 48 has a depending coaxial drive-part 50 located in the drive cavity 24 of the spool 14 to rotationally engage the spool. The thumbwheel 48 can be manually rotated in a film winding direction 52 to similarly rotate the spool 14 to wind the filmstrip 16 including the trailing film end portion 22 into the cartridge shell 12, and is continuously spaced from the first spur gear 46.

A second spur gear 54 continuously in mesh with the first spur gear 46 is coaxially fixed to a closing lever 56. An upstanding mount-pin 58 rotationally supports the second spur gear 54 and the closing lever 56, and maintains the second spur gear continuously spaced from the thumbwheel 48.

Figure 2:
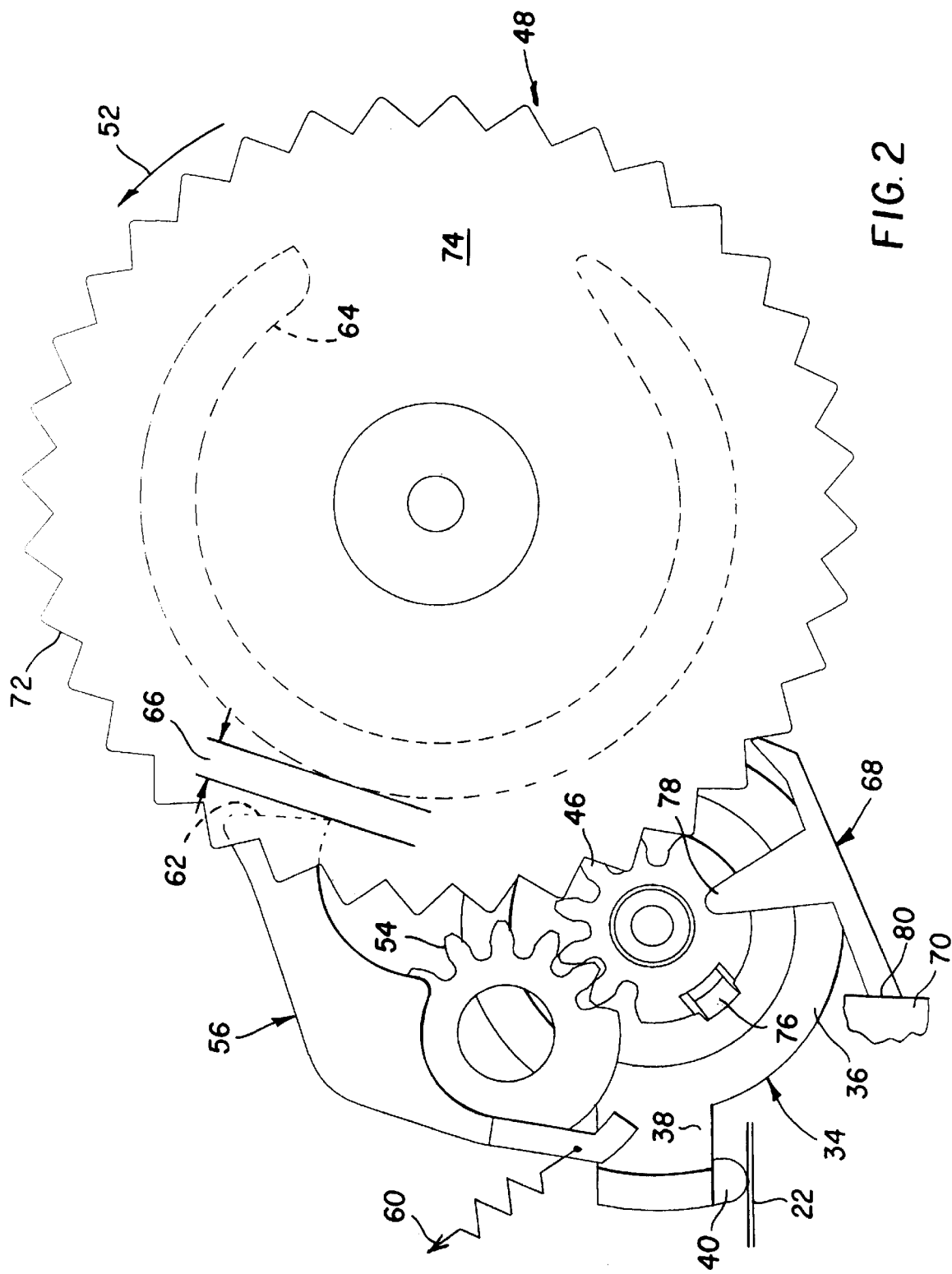
FIGS. 2, 3 and 4 are top plan views of the one-time-use camera, depicting a film winding operation.

A tension spring 60 biases the closing lever 56 to rotate with the second spur gear 54 in a clockwise direction in FIGS. 1–4 about the mount-pin 58 to, in turn, bias the first spur gear 46 to rotate in a counter-clockwise direction in FIGS. 1–4 to urge the sensor head 40 of the film sensor lever 38 against the filmstrip 16. Film resistance at the sensor head 40 is greater than the bias of the spring 60. As a result, the spring 60 is prevented from urging the closing lever 56 to rotate with the second spur gear 54 in a clockwise direction in FIGS. 1 and 2 in order to move one end 62 of the closing lever against an arcuate rib 64 on the underside of the thumbwheel 48. Instead, the lever end 62 is held spaced a slight distance 66 from the arcuate rib 64 as shown in FIG. 2.

As shown in FIGS. 1 and 2, a breakable anti-backup pawl 68 projects from a rear cover part 70 to be in engagement with successive peripheral teeth 72 of the thumbwheel 48. The anti-backup pawl 68 engages the thumbwheel 48 at its peripheral teeth 72 to prevent manual rotation of the thumbwheel in a reverse direction opposite to the film winding direction 52.

Operation

Beginning with FIGS. 1 and 2, when the thumbwheel 48 is manually rotated in the film winding direction 52 the trailing film end portion 22 is drawn from the sensor head 40 of the film sensor lever 58 and into the slot 20 in the cartridge shell 12. Once the trailing film end portion 22 is moved clear of the sensor head 40 the resulting absence of film resistance at the sensor head allows the spring 60 to rotate the closing lever 56 and the second spur gear 54 clockwise in FIG. 2 about the mount-pin 58 until the lever end 62 abuts the arcuate rib 64 on the underside of the thumbwheel 48. Consequently, the actuator unit 34 is rotated counter-clockwise in FIG. 2 via the first and second spur gears 46 and 54 to make the drive-part 42 similarly pivot the light lock 18 initially closed ten degrees, to partially (slightly) close the light lock.

Then, the thumbwheel 48 is manually rotated further in the film winding direction 52 to draw the trailing film end portion 22 from the slot 20 and into the interior of the cartridge shell 12 and to position a gap 74 in the arcuate rib 64 opposite the lever end 62. The presence of the gap 74 opposite the lever end 62 allows the spring 60 to rotate the closing lever 56 and the second spur gear 54 further clockwise about the mount-pin 58 until the lever end is seated in the gap. Consequently, the actuator unit 34 is rotated further counter-clockwise via the first and second spur gears 46 and 54 to make the drive-part 42 similarly pivot the light lock 18 further closed twenty degrees.

Figure 3:
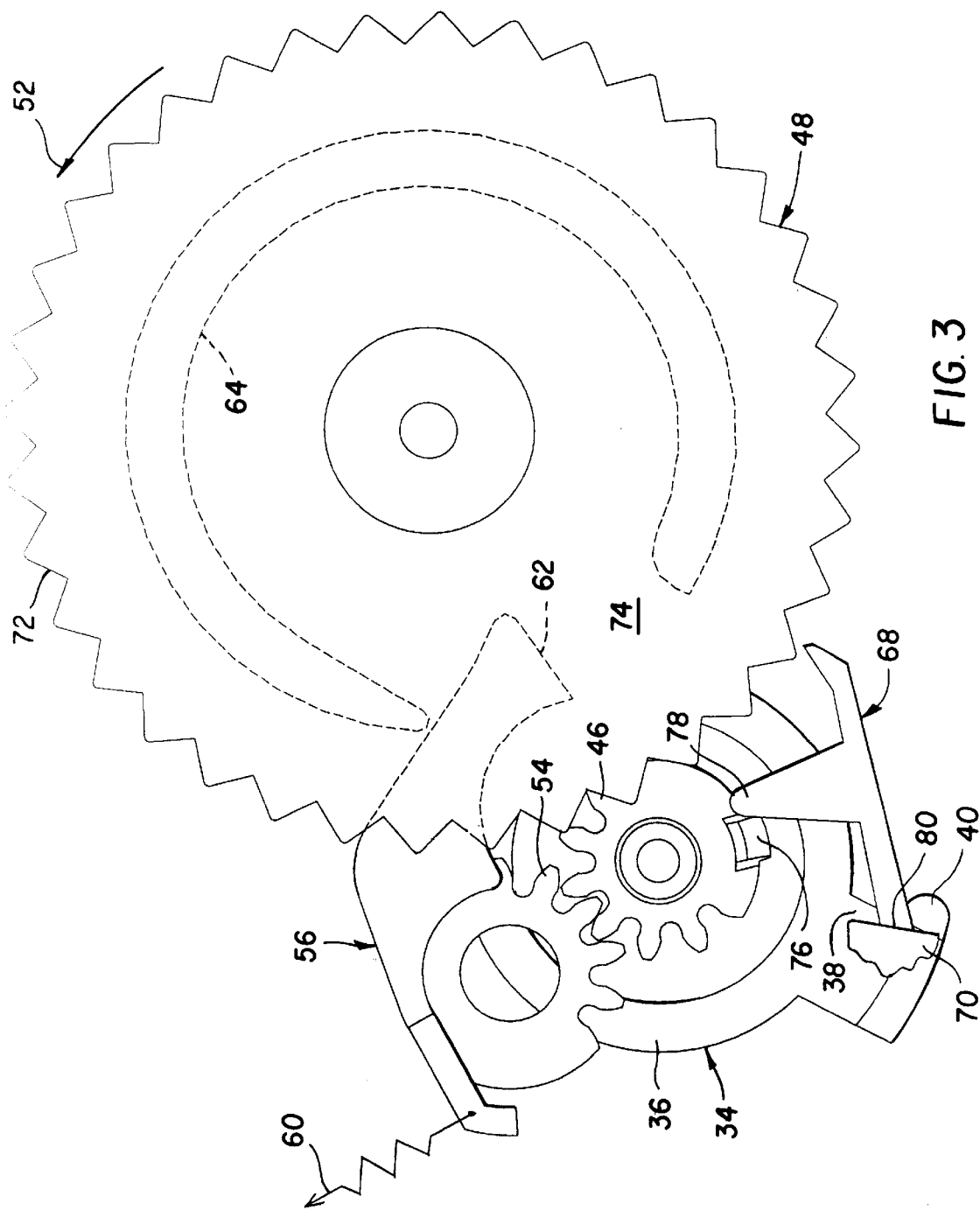

In FIG. 3, the thumbwheel 48 is manually rotated further in the film winding direction 52 to draw the trailing film end portion 22 further into the interior of the cartridge shell 12 and to make the arcuate rib 64 pivot the lever end 62 to rotate the closing lever 56 and the second spur gear 54 clockwise in FIG. 3 about the mount-pin 58. Consequently, the actuator unit 34 is rotated counter-clockwise in FIG. 3 via the first and second spur gears 46 and 54 to make the drive-part 42 similarly pivot the light lock 18 further closed thirty degrees. At this time, a breaking element 76 on the first spur gear 46 is swung against a protuberance 78 on the anti-backup pawl 68 to begin to bend the anti-backup pawl out of engagement with the peripheral teeth 72 of the thumbwheel 48. See FIG. 3.

Figure 4:
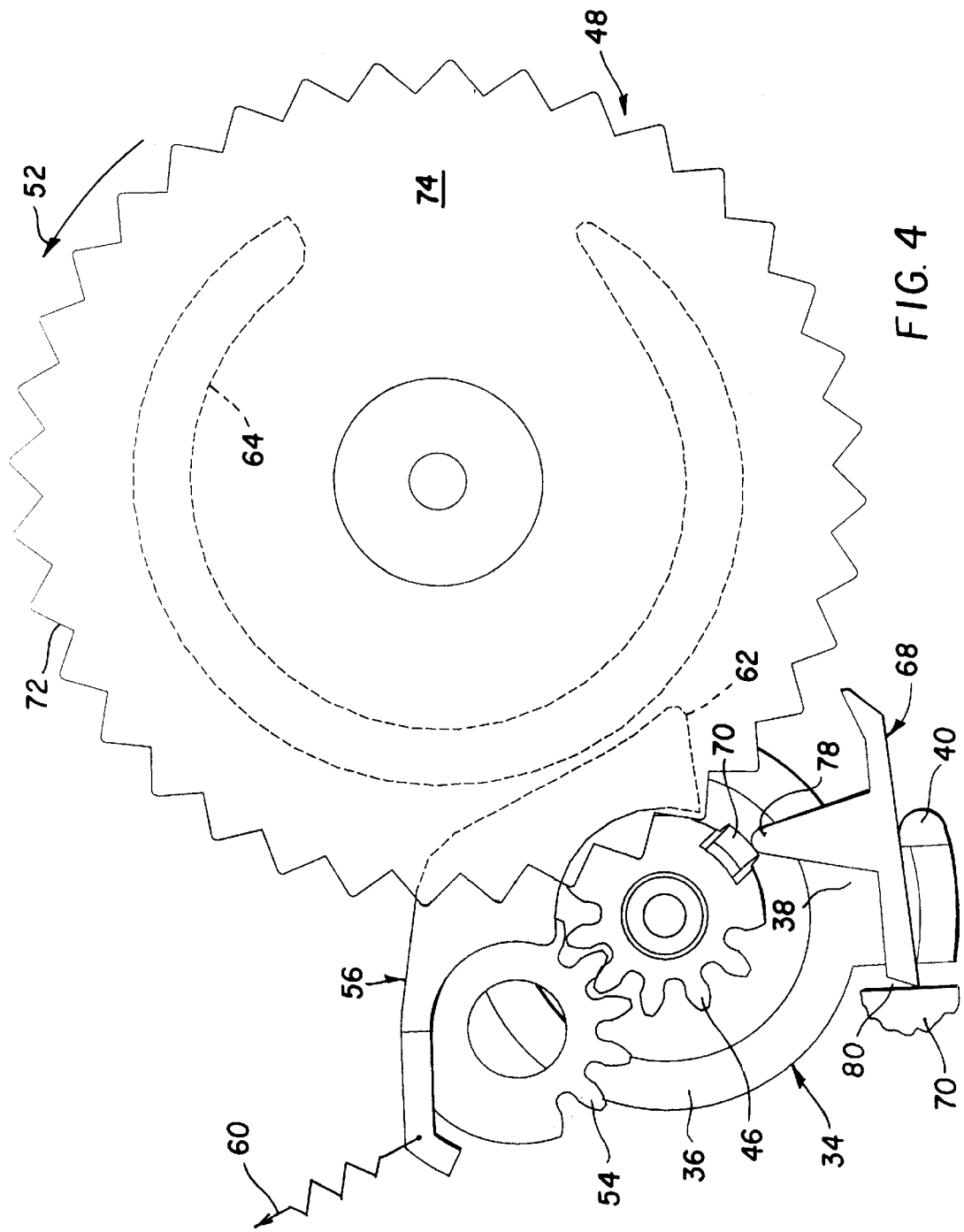

In FIG. 4, the thumbwheel 48 is manually rotated further in the film winding direction 52 than in FIG. 3 to draw the trailing film end portion 22 further into the interior of the cartridge shell 12 and to make the arcuate rib 64 pivot the lever end 62 to rotate the closing lever 56 and the second spur gear 54 clockwise in FIG. 4 about the mount-pin 58 until the lever end is pivoted out of the gap 74. Consequently, the actuator unit 34 is rotated counter-clockwise in FIG. 4 via the first and second spur gears 46 and 54 to make the drive-part 42 similarly pivot the light lock 18 further closed thirty-two degrees to completely close the light lock. At this time, the breaking element 76 on the first spur gear 46 is swung further against the protuberance 78 on the anti-backup pawl 68 to further bend the anti-backup pawl away from the peripheral teeth 72 of the thumbwheel 48 until the anti-backup pawl is broken away from the rear cover part 70 at a weakened portion 80 of the anti-backup pawl.

The invention has been described with reference to a preferred embodiment. However, it will be appreciated that variations and modifications can be effected by a person of ordinary skill in the art without departing from the scope of the invention

PARTS LIST 10. film cartridge
12. cartridge shell
14. flanged spool
16. filmstrip
18. light lock
20. slot
22. trailing film end portion
24. drive cavity
26. drive end
28. drive cavity
30. one-time-use camera
32. cartridge chamber
34. actuator unit
36. driver
38. film sensor lever
40. sensor head
42. drive-part
44. gear-support-part
46. first spur gear
48. thumbwheel
50. drive-part
52. film winding direction
54. second spur gear
56. closing lever
58. mount-pin
60. tension spring
62. lever end
64. arcuate rib
66. slight distance
68. anti-backup pawl
70. rear cover part
72. peripheral teeth of thumbwheel 48
74. gap
76. breaking element
78. pawl protuberance
80. weakened portion

What is claimed is:

1. A one-time-use camera for use with a film cartridge having a spool rotatable to wind an exposed filmstrip including a trailing film end portion into the cartridge and a light lock movable to be closed after the trailing film end portion is wound into the cartridge, comprising a film winder rotatable in engagement with the spool in a film winding direction to rotate the spool in the same direction to wind the exposed filmstrip including the trailing film end portion into the cartridge, and a closing actuator movable in engagement with the light lock to close the light lock, is characterized in that:

an anti-backup pawl for engaging said film winder to prevent rotation of the film winder in a reverse direction opposite to the film winding direction is breakable; and said closing actuator has a breaking element for breaking said anti-backup pawl when the closing actuator is moved in engagement with the light lock to close the light lock.

2. A one-time-use camera as recited in claim 1, wherein said anti-backup pawl projects from a rear cover part to be broken of said rear cover part.

3. A one-time-use camera as recited in claim 1, wherein said film winder is coupled with said closing actuator to move the closing actuator to close the light lock and to break said anti-backup pawl when the film winder is further rotated in the film winding direction after the trailing film end portion is wound into the cartridge.

4. A one-time-use camera for use with a film cartridge having a spool rotatable to wind an exposed filmstrip including a trailing film end portion into the cartridge and a light lock movable to be closed after the trailing film end portion is wound into the cartridge, comprising a film winder rotatable in engagement with the spool in a film winding direction to rotate the spool in the same direction to wind the exposed filmstrip including the trailing film end portion into the cartridge and coupled with the light lock after the trailing film end portion is wound into the cartridge to close the light lock when said film winder is further rotated in the film winding direction, is characterized in that:

an anti-backup pawl engages said film winder to prevent rotation of the film winder in a reverse direction opposite to the film winding direction and is configured to be broken when the film winder is coupled with the light lock and further rotated in the film winding direction.

* * * * *